June 8, 1926.

A. CHRISTENSEN ET AL 1,588,309

THINNING OUT AND WEEDING MACHINE

Filed July 15, 1925     2 Sheets-Sheet 1

WITNESSES
H. T. Walker
A. L. Kitchin

INVENTOR
A. Christensen
A. W. Worsen
BY Munn & Co
ATTORNEYS

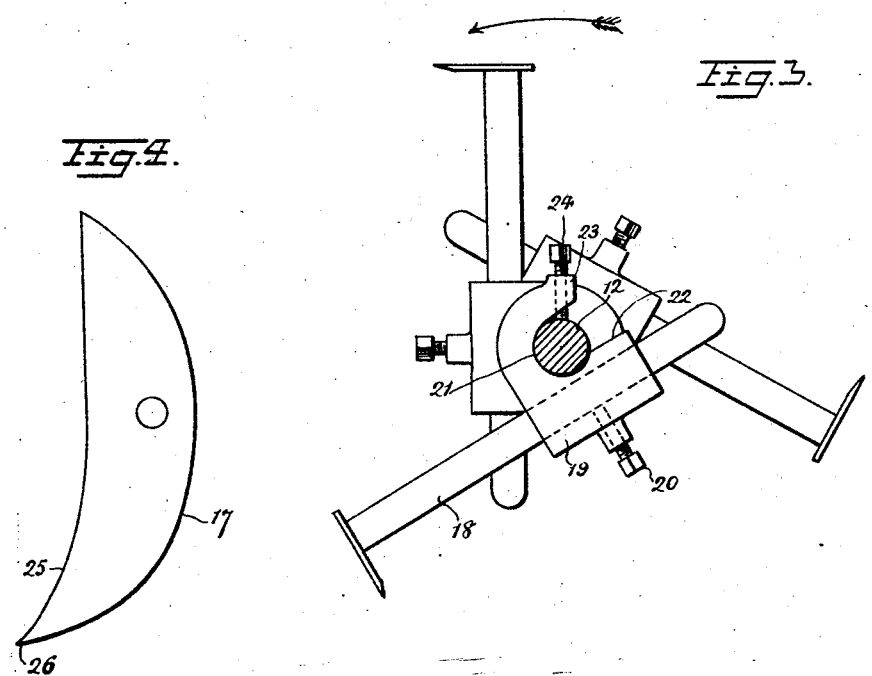

Patented June 8, 1926.

1,588,309

UNITED STATES PATENT OFFICE.

ANDERS CHRISTENSEN, OF WILSON, AND AUGUST WARNER WARSEN, OF HARTFORD, CONNECTICUT, ASSIGNORS OF TWO-THIRDS TO SAID CHRISTENSEN AND OF ONE-THIRD TO SAID WARSEN.

THINNING-OUT AND WEEDING MACHINE.

Application filed July 15, 1925. Serial No. 43,830.

This invention relates to cultivating apparatus and particularly to an improved machine for thinning out and weeding growing vegetation, the object being to provide a simple construction which may be readily manipulated and which will act to quickly thin out planted vegetables according to different desired methods of thinning.

Another object of the invention is to provide a machine for thinning out and weeding vegetables sown in rows, the arrangement being such that the parts may be adjusted to remove large portions of the vegetables or small portions at short intervals.

A still further object of the invention, more specifically, is to provide a thining out and wedding machine wherein a number of blades are provided formed to give clean cuts through the earth and vegetables as well as the weeds so that a cultivating action will be had in addition to the weeding and thinning out.

In the accompanying drawings—

Figure 3 is an enlarged view showing a plurality of cutters and associated parts in elevation mounted on a shaft shown in section, the arrangement forming certain features of the invention.

Figure 4 is a plan view of a blade embodying certain features of the invention.

Figure 1:
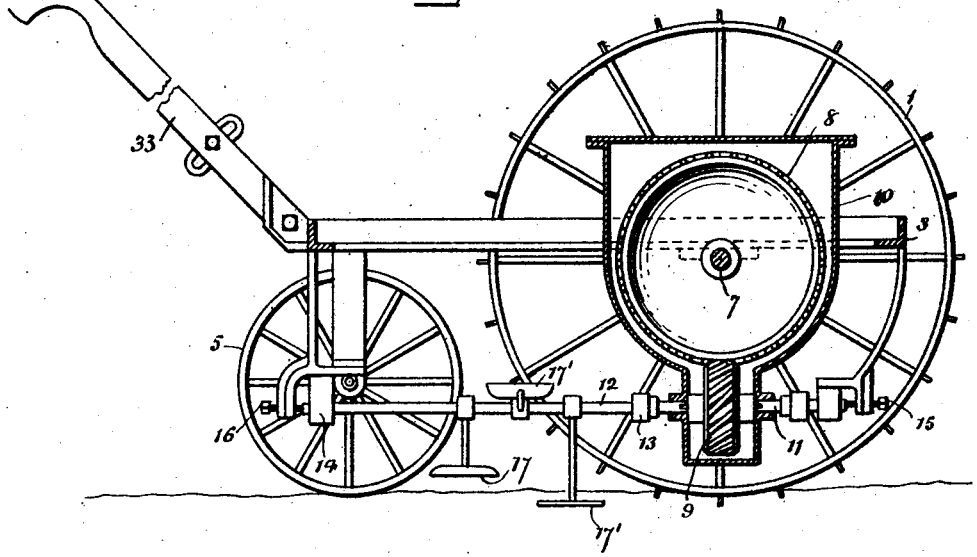
Figure 1 is a longitudinal vertical sectional view through a machine, disclosing an embodiment of the invention.
Figure 2:
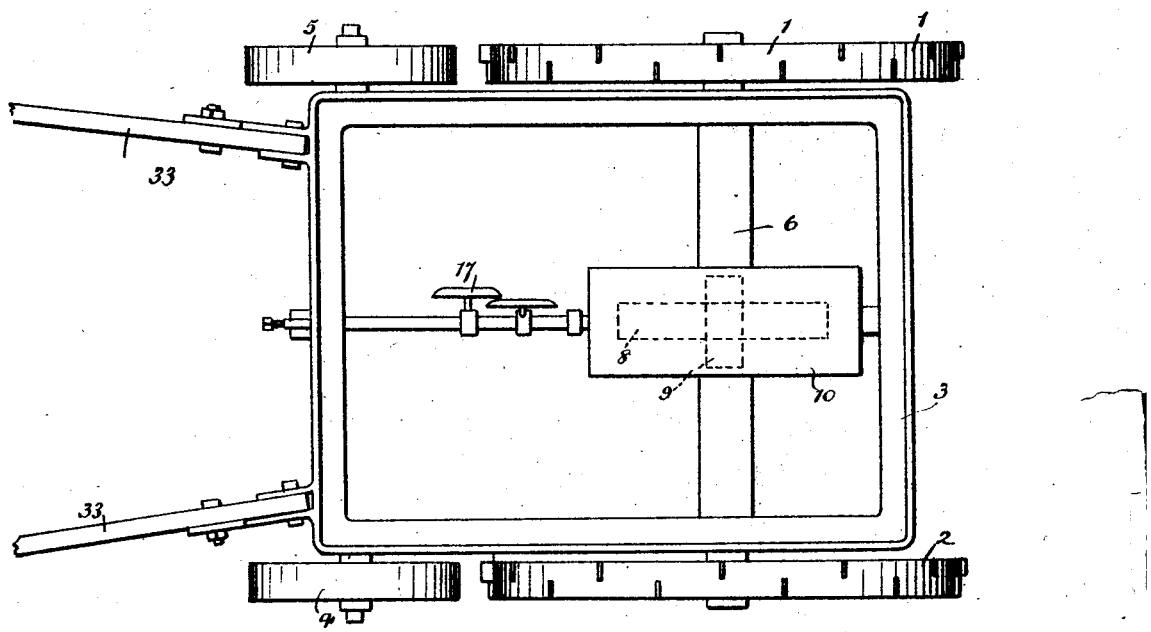
Figure 2 is a top plan view of the machine shown in Figure 1.

Referring to the accompanying drawings by numerals, 1 and 2 indicate the power or traction wheels on which the frame 3 is mounted. A pair of small rear wheels 4 and 5 are also provided and act to support the rear of the frame 3 and parts mounted thereon. A suitable sleeve or casing 6 is connected with the frame 3 and through this sleeve extends the shaft 7, which shaft is keyed or otherwise rigidly secured to the spiral gear 8. The gear 8 continually meshes with another spiral gear 9 and these two gears are arranged in a housing 10 whereby dust and foreign matter is substantially eliminated and also whereby oil may be readily applied so that if desired, the gears may operate in oil. A shaft 11 extends through gear wheel 9 and is splined thereto, said shaft being connected with shaft 12 by a suitable coupling 13 of any desired kind. The shaft 12 is supported by the coupling 13 and by a bracket 14 and both of the shafts 11 and 12 are adjusted longitudinally by the end thrust screws 15 and 16. Mounted on the shaft 12 are a number of hoes or cutting blades 17, the same being adjustably connected to the shaft 12 as hereinafter fully described. As these members are all identical, the description of one will apply to all.

From Figure 3 it will be noted that the blade 17 is secured in any desired manner to a shank 18 which is slidingly mounted in the fitting 19 and locked in different adjusted positions by the set screw 20. The fitting 19 is provided with a socket 21 having an opening 22, said socket accommodating the shaft 12. A threaded portion 23 is provided on the fitting 19 and accommodates the set screw 24 which clamps against the shaft 12 so as to lock the fitting in any desired position on the shaft 12. As illustrated in Figure 1, there is provided three hoes or cutters 17, 17′ and 17″, though if desired, one or more hoes could be used without departing from the spirit of the invention.

From Figure 4 it will be noted that each of the hoes is provided with a concaved cutting edge 25, which by reason of its construction, presents an entrance point 26. This construction causes a clean cut as the hoe or cutter moves so that none of the vegetation will cling to the hoe. When the various hoes are set as shown in Figure 1, a row of vegetation, will have short portions cut therefrom with short portions left, said short portions being of the same length as the cut away portion. If desired, the parts could be so arranged that smaller sections are left than cut away or the reverse could be provided.

In operation, after the hoes have been set in the desired manner, the machine is moved until it straddles a row of vegetation of any kind, as for instance, carrots, and is then pushed along with the rod 12 directly above the vegetation. As the apparatus is pushed along, power will be transmitted to the shaft 12 and the hoes or cutters will be moved in circles. The shanks 18 are adjusted to the desired position so that the cutters will pass a short distance beneath the upper surface of the ground as it cuts the vegetation whereby the weeds, as well as other vegetation, are cut and the ground is somewhat loosened up which thereby produces a cultivating effect as well as a thinning out and weeding effect. Preferably when the apparatus is in use, the respective handles 22 are grasped by the workman and the apparatus is forced along manually. Ordinarily, the cutters will properly function at any desired speed at which the workmen may care to move the apparatus. However, where very small sections of the vegetation are left with a small cut therebetween, preferably the apparatus is moved along at a speed equal to the ordinary walk of the workmen.

What we claim is:

In a thinning out and weeding machine, a cutter blade, a shank extending therefrom, a fitting formed with a notch and a passage-way, said shank extending through said passage-way, a clamping set screw for clamping said shank in said passage-way, a driving shaft, said notch being positioned to accommodate said driving shaft, and a set screw positioned to clamp said driving shaft so as to rigidly secure said fitting to the shaft, said last mentioned set screw being capable of clamping the fitting at any point around the periphery of the shaft and at any point longitudinally of the shaft.

ANDERS CHRISTENSEN.
AUGUST WARNER WARSEN.